June 26, 1923.
W. S. HODGES
1,460,323
OVEN CHARGING AND UNLOADING APPARATUS
Filed May 15, 1922
6 Sheets-Sheet 1
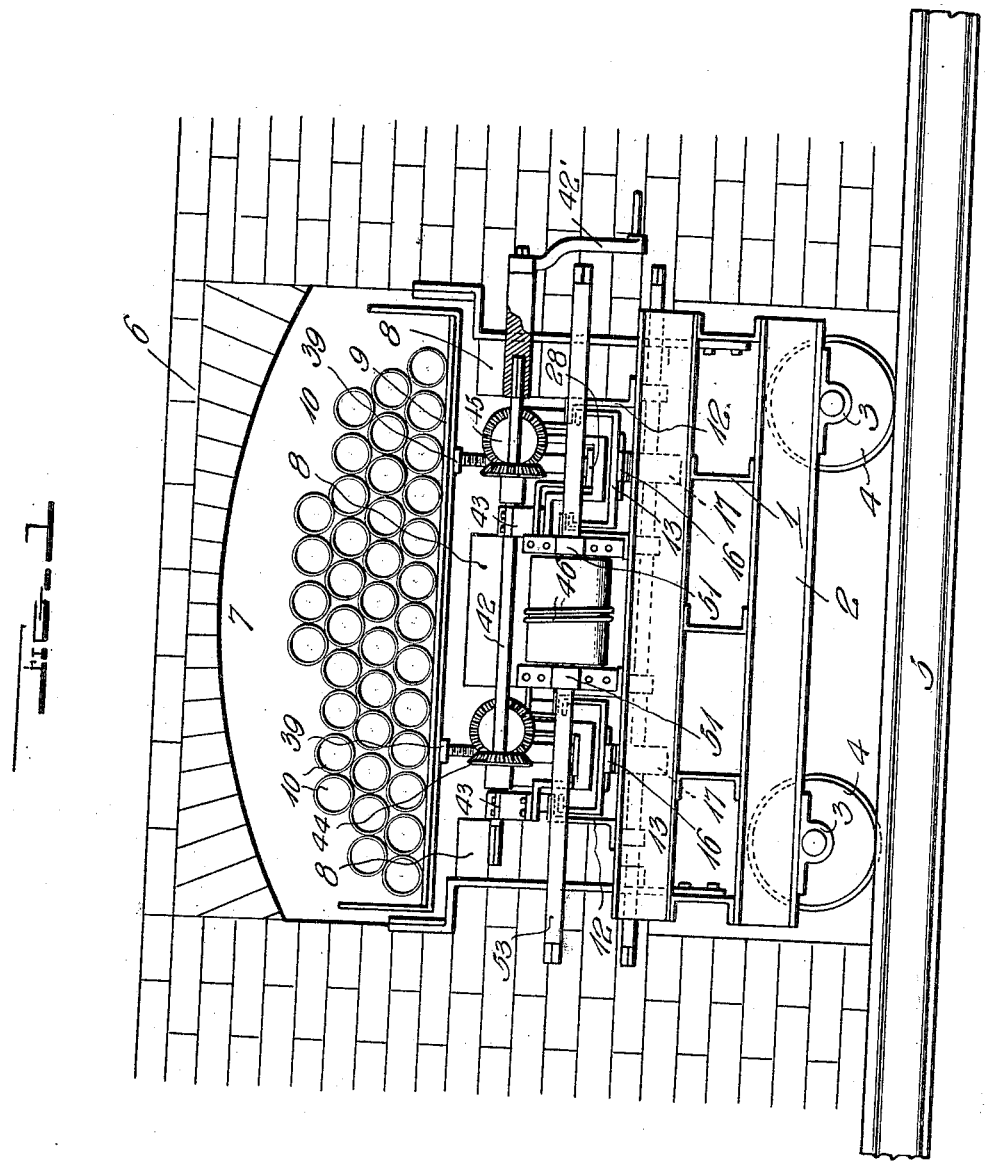
Witness
Inventor
Wayne S. Hodges
By H. B. Willson & Co.
Attorneys June 26, 1923.
W. S. HODGES
1,460,323
OVEN CHARGING AND UNLOADING APPARATUS
Filed May 15, 1922
6 Sheets-Sheet 2
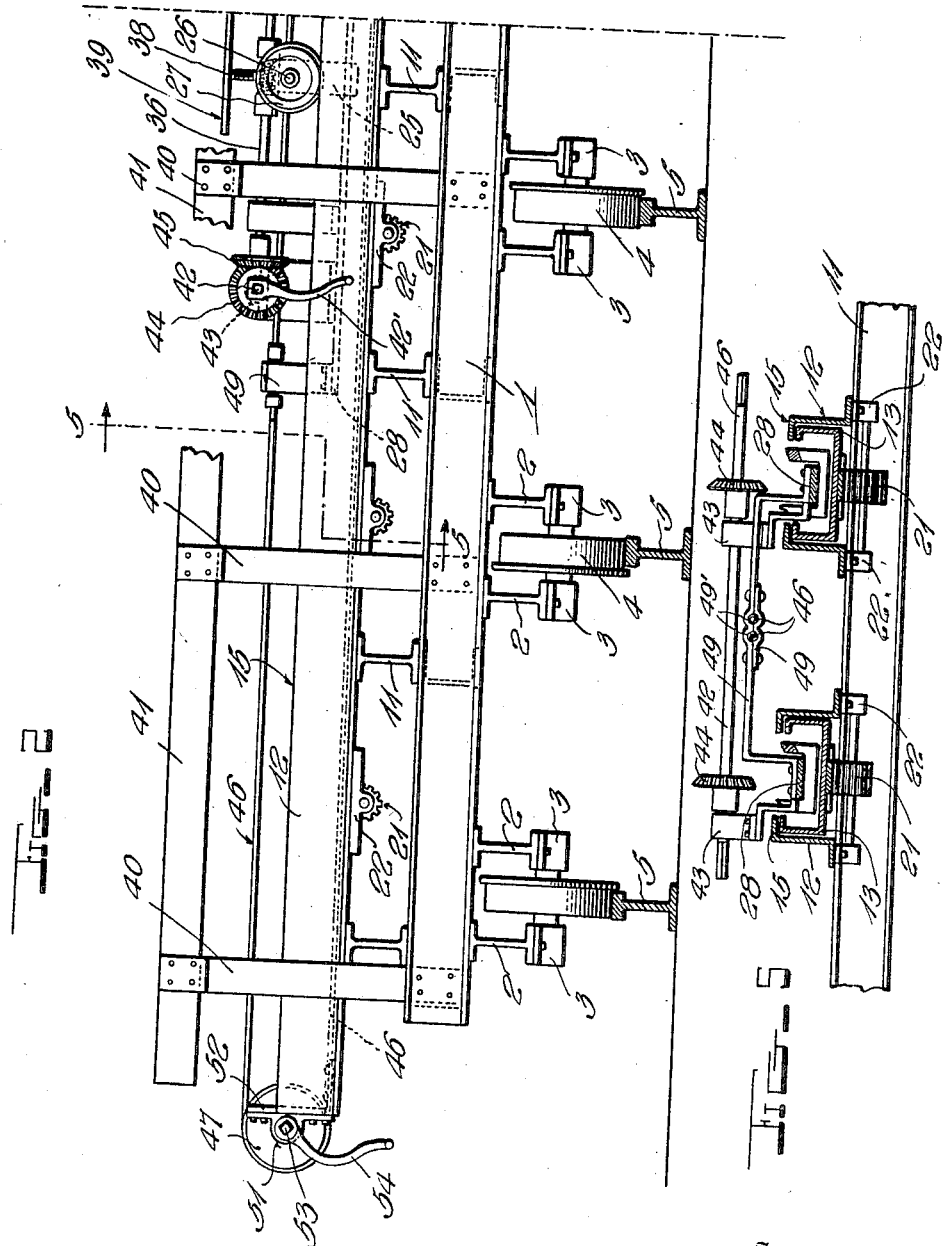
Witness
Inventor
Wayne S. Hodges
By
Attorneys

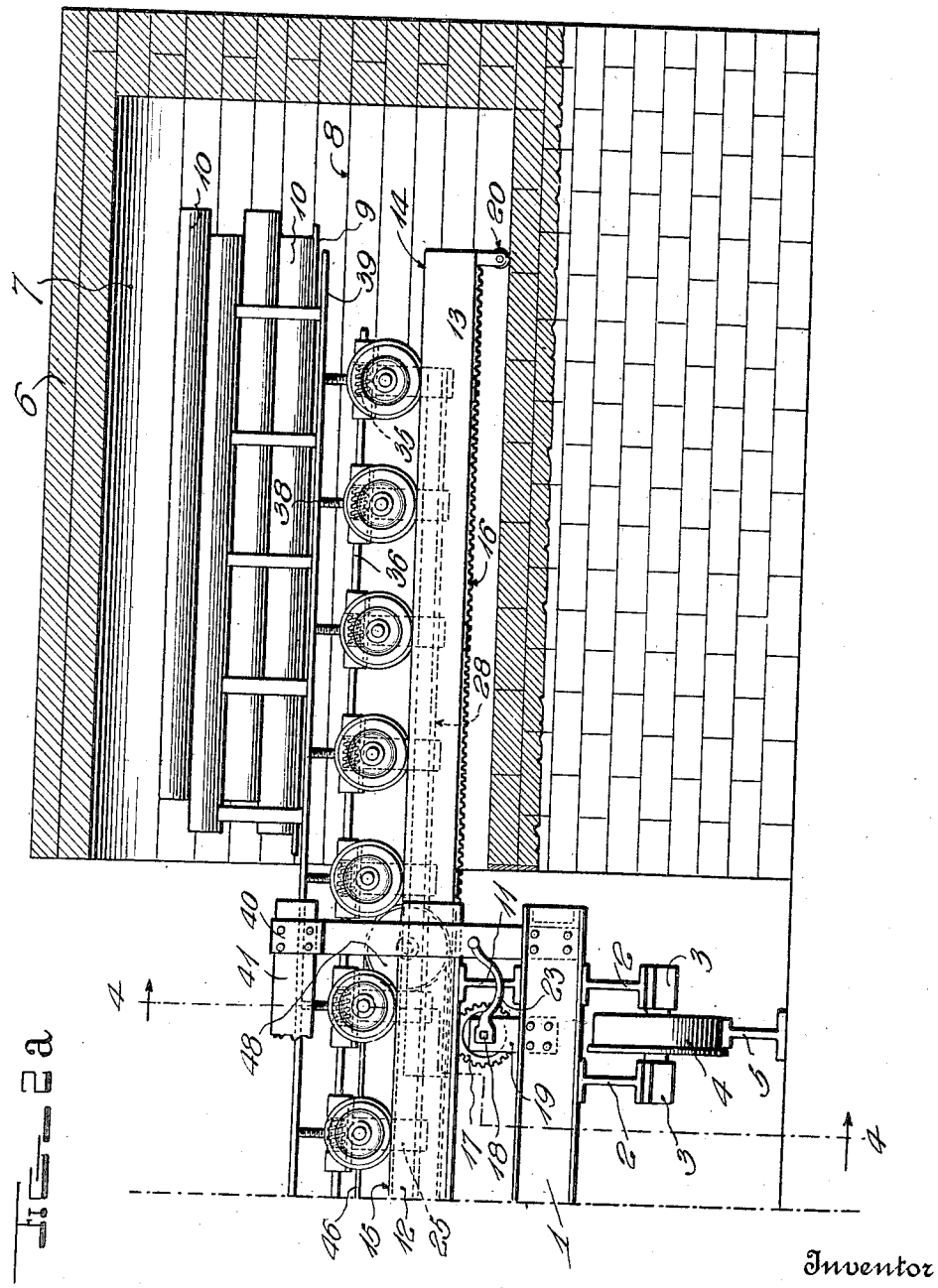

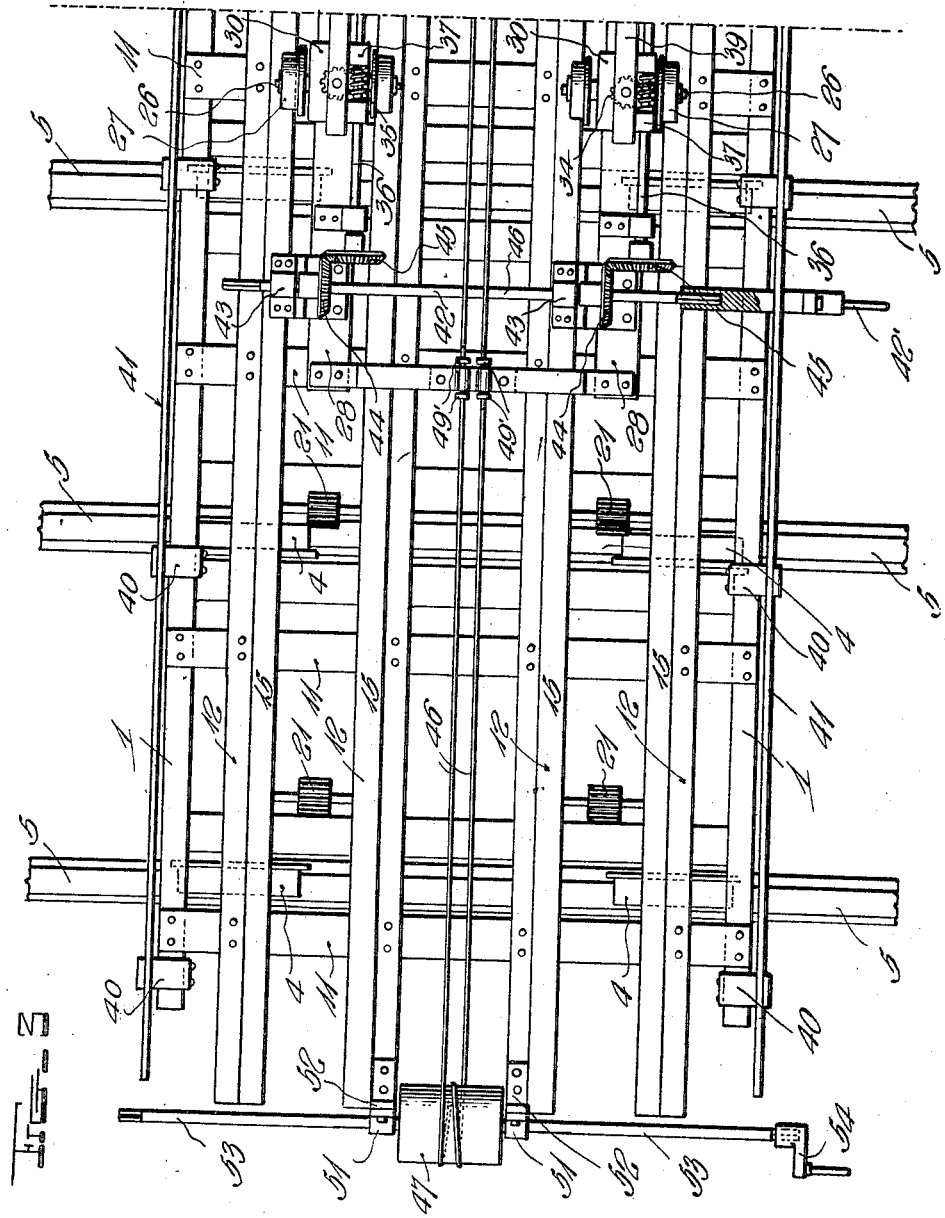

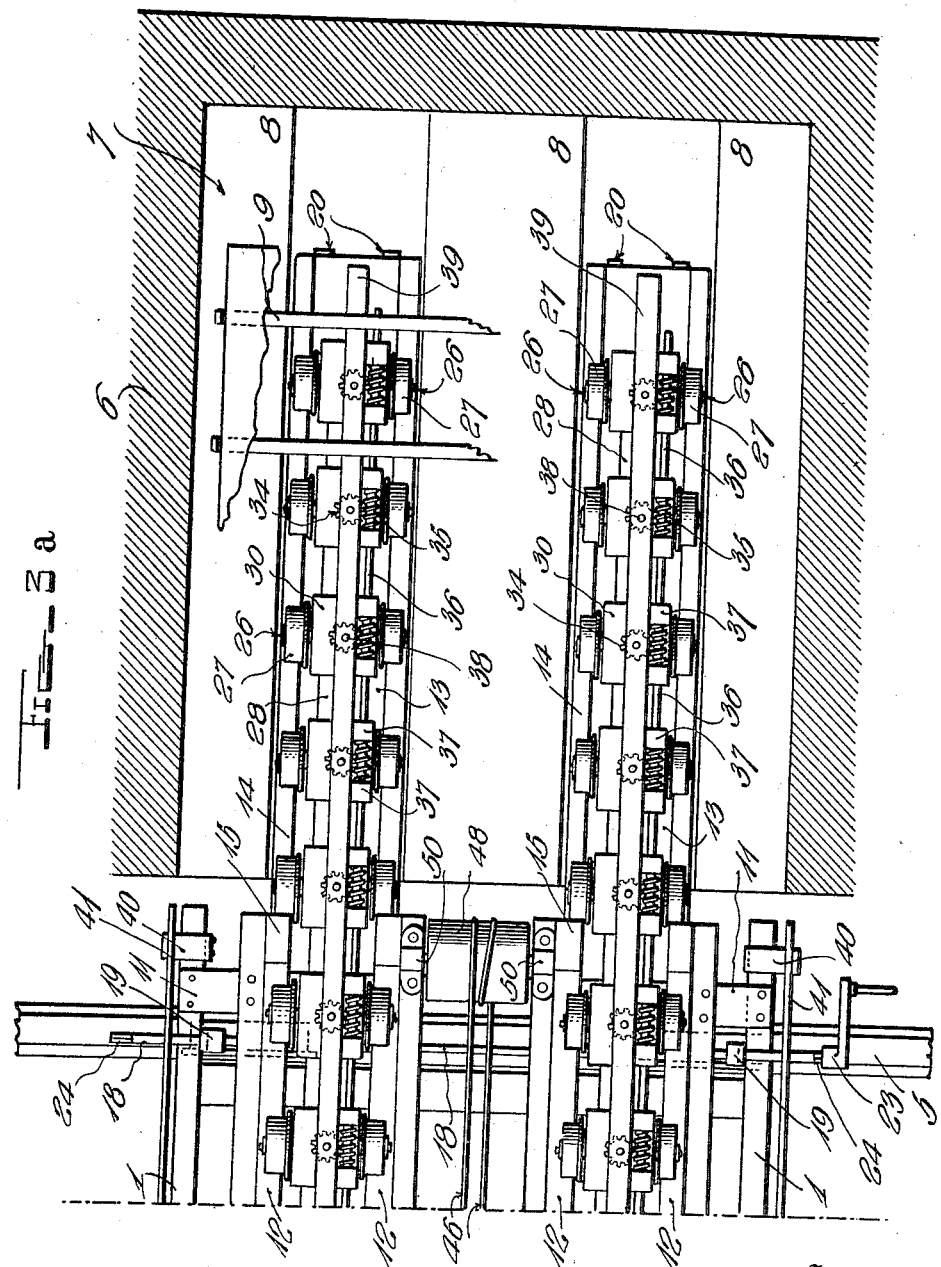

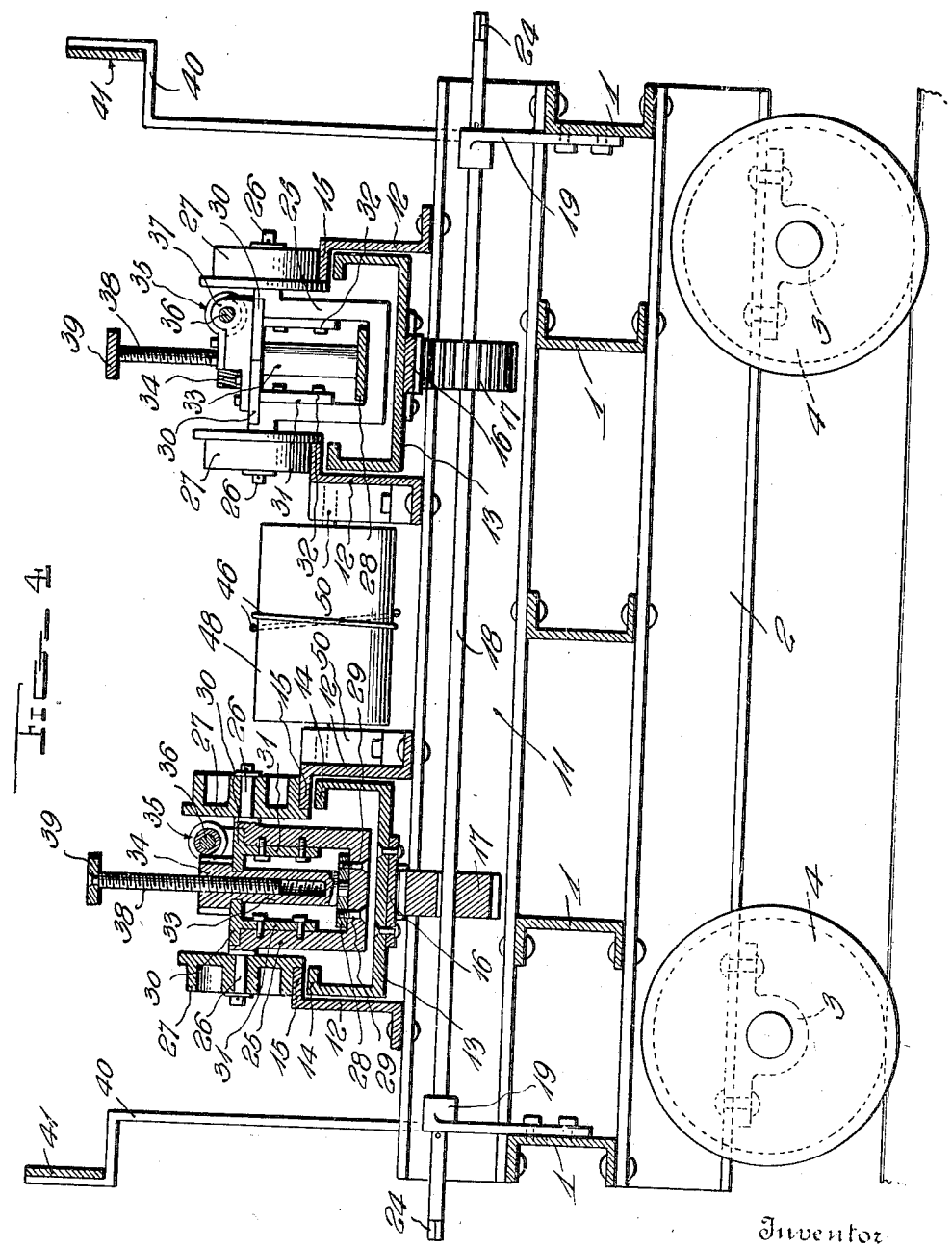

Patented June 26, 1923.

1,460,323

UNITED STATES PATENT OFFICE.

WAYNE S. HODGES, OF SHELBY, OHIO.

OVEN CHARGING AND UNLOADING APPARATUS.

Application filed May 15, 1922. Serial No. 561,179.

*To all whom it may concern:*

Be it known that I, WAYNE S. HODGES, a citizen of the United States, residing at Shelby, in the county of Richland and State of Ohio, have invented certain new and useful Improvements in Oven Charging and Unloading Apparatus; and I do declare the following to be a full, clear, and exact description of the invention, such as will enable others skilled in the art to which it appertains to make and use the same.

This invention relates to an apparatus for charging an annealing oven and unloading the same and one object of the invention is to provide an apparatus of the character described which is so constructed that bars or tubes which are to be placed in the oven or removed from the same may be readily moved into and out of the oven.

Another object of the invention is to provide an improved type of truck movable upon tracks into and out of operative relation to the oven and to provide an improved type of carriage mounted upon extensible tracks of an improved type carried by the truck, the extensible tracks being movable into and out of the oven so that the carriage may be moved into and out of the oven and thus convey a basket in which the bars or tubes will be placed into and out of the oven.

Another object of the invention is to so construct this carriage that the basket may be moved vertically out of engagement with supports carried by the truck upon opposite sides of the carriage and then after being moved into the oven lowered to bring the basket onto the supports within the oven.

Another object of the invention is to so construct the elevating means that a number of jacks having internally threaded sleeves receiving threaded standards may have their sleeves simultaneously rotated so that all of the jacks will be operated at the same time and thus the basket kept level while being raised or lowered.

Another object of the invention is to so construct the extensible track sections that they may fit into, or in other words have telescoping relation to the stationary track section and to provide means for easily moving the track sections into or out of the oven.

This invention is illustrated in the accompanying drawings, wherein:

Figure 1 is a view showing the improved device in end elevation and positioned in front of an oven shown in front elevation.

Figures 2 and 2ª show the improved device in side elevation and partially extended into the oven, the extensible track being extended into the oven to its full extent.

Figures 3 and 3ª show the structure of Figs 2 and 2ª in top plan.

Figure 4 is a vertical transverse sectional view taken along the line 4—4 of Fig. 2ª.

Figure 5 is a fragmentary transverse sectional view taken along the line 5—5 of Fig. 2.

This device is provided with a truck having beams 1, which are formed of angle iron and are secured upon I-beams 2 arranged in pairs as shown in Fig. 2 and carry bearings 3 in which will be mounted the axle of the wheel 4 which rests upon the tracks 5. These tracks 5 are laid upon the floor in front of a number of ovens and it will be seen that the truck may be moved into position in front of the desired oven, thus permitting the same truck to be used for all of the ovens. The ovens are of a conventional construction and therefore the oven shown in Figs 1, 2ª and 3ª is indicated in general by the numeral 6.

Each of these ovens is provided with the usual chamber 7 into which the bars or tubes to be heated are placed and this chamber is provided in its lower portion with pillars 8 which provide supports for a basket 9 in which the bars 10 are placed and also provides between them channels into which the extensible track sections to be hereinafter described are to be extended. I-beams 11 are mounted upon the angle iron beams 1 and extend transversely thereof and serve to support the beams 12 which form the spaced side members of the permanent track section. The extensible track sections 13 are positioned in telescoping relation to the stationary track sections and are substantially U-shaped in cross section as shown in Fig. 3 and have inwardly extending wheel-engaging portions 14 which are positioned beneath the wheel-engaging portions 15 of the stationary track section. Each of the extensible track sections is provided upon its underface with a rack strip 16 and these rack strips 16 are engaged by the teeth of the pinions 17 carried by a shaft 18 which is journaled in bearing brackets 19 carried by certain of the beams 1. By turning the shaft 18, the extensible track sections will be moved into and out of the oven and it will thus be seen that the carriage which moves along the track of the truck may be readily moved into and out of the oven. A roller 20 is provided at the end of each of these extensible track sections to rest upon the bottoms of the channels between the supports 8 and thus permit of the extensible track sections being easily moved into and out of the oven. Roller pinions 21 are mounted in bearings 22 carried by the stationary track sections and engage the track strip so that these extensible track sections will be mounted upon the rollers and thus permitted to slide very easily when the shaft 18 is turned by means of the crank handle 23 which will be placed upon the squared end 24 of the shaft 18.

The carriage which is to move along the track carried by the truck is provided with a plurality of jack elements each of which is provided with a yoke 25 which is U-shaped and provided with outstanding side arms forming axle elements 26 upon which are mounted wheels 27 to rest upon the tracks as shown in Fig. 3. These yokes are connected by bars 28 which are secured to the yokes by rivets or other similar fasteners 29 and it will thus be seen that such elements will be connected and will move together. These yokes have head plates 30 which are provided with depending arms 31 secured to the arms of the yokes by fasteners 32 and each of these head plates is provided with a central opening through which will pass a sleeve 33. Each of these sleeves is provided at its lower end with a pin extension which rotatably fits into an opening formed in the bar 28 and at the upper end the sleeve is provided with a head 34 having worm teeth engaged by one of the worms 35 carried by a shaft 26 rotatably mounted in bearings 37 carried by the head plates. Standards 38 which are threaded are screwed into internally threaded sleeves 32 and have their upper ends connected with bars or strips 39 upon which the pan or basket 9 is placed. The standards 38 are held against rotation and it will thus be seen that when the sleeves are rotated, the standards will be moved vertically and thus the strips 39 will be lifted or lowered. The pan or basket will thus be supported upon strips which will be vertically adjustable so that a loaded pan or basket may be lifted out of the supports 40 which are carried by the main frame of the device. The supports are connected by the side bars 41 and will be lifted to permit of movement into the oven and then lowered so that the basket will rest upon the pillars 8 within the oven.

When the pan or basket is to be lifted or lowered, it is desired to have the strips 39 upon which it rests set level and therefore all of the jacks must be operated at the same time so that the standards 38 of these jacks will be raised or lowered a like amount. In order to do so there has been provided a driving shaft 42 which is journaled in bearings 43 and carries bevel gears 44 which mesh with bevel gears 45 carried by the shaft 36. This shaft 42 has its end portions squared so that a crank handle 42' may be placed upon either end of the shaft and this shaft then rotated to impart rotary movement to the shaft 36 and thus simultaneously rotate these shafts. After the basket has been raised the carriage is to be moved along the track into or out of the oven and the shaft 42 then rotated in a reverse direction so that the basket may be deposited upon the pillars 8 or supported upon the supporting arms 40.

In order to move the carriage along the tracks into and out of the oven, there has been provided a rope 46 which extends longitudinally of the carriage and has its end portions cast about drums 47 and 48 and secured to the cross bar 49 by means of collars 49' as shown in Fig. 3. In order to rotatably mount the drum 48 there has been provided bearings 50 which are secured upon the base portions of the inner stationary track sections 12 and in order to rotatably mount the drum 47 there has been provided bearings 51 secured upon brackets 52 secured upon the stationary track section. This drum 47 is provided with an elongated shaft 53 which is journaled in the bearings 51 and has squared end portions so that a crank 54 may be placed upon either end of this shaft and the shaft thus rotated. When this shaft 53 is turned, the table will be moved longitudinally between the drums 47 and 48 and the carriage will be moved along the track into or out of the oven according to the direction in which the shaft is rotated.

When this device is in use, the main truck will be moved along the tracks 5 into the proper position in front of one of the ovens, the basket 9 which carries the tubes or bars will be deposited upon the supports 40 either before the truck is moved into position in front of the oven or after the truck is in place. When the truck is in the proper position in front of the oven, the shaft 42 will be rotated to lift the frame until it engages the basket and lifts it off of the support. The shaft 18 can now be rotated to extend the movable track sections into the oven and after the track sections are extended into the oven, the shaft 53 will be rotated to move the carriage along the tracks into the oven. The shaft 42 will now be rotated to lower the jacks and the basket will be left resting upon the pillars 8. The shaft 53 can now be rotated to move the carriage downwardly and the shaft 18 rotated to withdraw the movable track section. The oven doors can then be closed and the truck moved along the tracks 5 to an oven which is to be unloaded. The extensible track sections will be moved into this oven between the pillars 8 and after the carriage has been moved into the oven, the shaft 42 will be rotated to raise the jacks and uplift the basket off of the supporting pillars. The carriage can then be moved outwardly and will carry with it the loaded basket. The extensible track sections can then be moved outwardly to the retracted position and the jacks lowered so that the basket will be supported by the supports 40. This loaded basket can then be lifted by means of a suitable crane or the truck can be moved along the tracks 5 to a place where it can be conveniently unloaded or the basket picked up by a crane and carried to the place where it is to be unloaded. It will thus be seen that there has been provided a device which can be very conveniently used for charging and unloading annealing ovens.

I claim:

1. An oven charging device comprising a truck for moving relative to an oven, tracks carried by said truck and having extensible sections, means for moving the extensible track sections into and out of an oven, a carriage movable upon said tracks, an article carrying pan adapted to rest upon supports in an oven, supports carried by said truck for supporting the pan above said carriage and vertically movable means carried by the carriage for lifting the pan from the supports of the truck or oven.

2. An oven charging device comprising a truck movable into and out of operative relation to an oven, tracks carried by said truck and having sections movable into and out of an oven, a carriage movable upon the tracks into and out of the oven, an article carrier bodily movable into and out of the oven, supports carried by said truck for supporting the article carrier above the carriage, and vertically adjustable carrier engaging means carried on said carriage and adapted to deposit the pan upon the supports in the oven, the carriage and movable track sections being then removable from the oven with the carrier remaining in the oven.

3. The structure of claim 1 having the vertically movable means consisting of a frame for carrying the article carrying pan and adapted to rest upon the supports of the carriage, and jacks carried by the carriage and having vertically movable standards connected with said frame.

4. The structure of claim 1 having the vertically movable means consisting of a frame for carrying the article carrying pan and adapted to rest upon the supports of the carriage, and jacks carried by the carriage and having rotatable sleeves, threaded standards carried by said sleeves, and connected with said frame, and means for simultaneously rotating the sleeves of the jacks and vertically adjusting the jacks to raise and lower said frame.

5. The structure of claim 1 having the vertically movable means consisting of a frame for carrying the article carrying pan and adapted to rest upon the supports of the carriage, and jacks carried by the carriage and having rotatable sleeves, threaded standards carried by said sleeves, and connected with said frame, driven shafts rotatably carried by said carriage, means for transmitting rotary movement from the driven shafts to said sleeves, a driving shaft rotatably carried by said carriage and means for transmitting rotary movement from the driving shaft to the driven shafts.

6. The structure of claim 1 and drums rotatably mounted adjacent the ends of said truck, an arm carried by said carriage, and a cable passing between and about said drums and having its ends connected with said arm and imparting movement to said carriage when the drums are rotated.

7. The structure of claim 1 having each track provided with a stationary section having side portions between which the movable back section slides, the movable section being formed of a U-beam and having rack teeth upon its bottom, a shaft rotatably carried by the truck, and pinions carried by said shaft and engaging the racks of the movable track section.

8. The structure of claim 1 having the carriage provided with spaced sections each having U-shaped yoke elements having side arms forming axles, wheels upon the axles resting upon the tracks of the truck, heads carried by said yokes, internally threaded sleeves rotatably supported by the yokes and heads, threaded standards in the sleeves having their upper ends connected with the tray carrying means, and operating means including shafts rotatably carried by the heads and having geared connections with the sleeves.

In testimony whereof I have hereunto set my hand.

WAYNE S. HODGES.